United States Patent Office 3,736,112
Patented May 29, 1973

3,736,112
HERBICIDAL COMPOSITIONS
Walter W. Abramitis, Downers Grove, Steven C. Ducey, Westmont, and James G. Atherton, Hoffman Estates, Ill., assignors to Akzona Incorporated, Asheville, N.C.
No Drawing. Continuation-in-part of application Ser. No. 645,614, June 13, 1967. This application Mar. 31, 1970, Ser. No. 24,376
Int. Cl. A01n 9/26
U.S. Cl. 71—110
15 Claims

ABSTRACT OF THE DISCLOSURE

Herbicidal concentrate compositions containing carboxylic acid salts of amino ester of herbicidal acids and an organic solvent providing compositions having a high level of active herbicidal ingredient and water-in-oil emulsification properties.

CROSS REFERENCE TO RELATED APPLICATION

This application is a continuation-in-part of our pending application, Ser. No. 645,614, filed June 13, 1967, now abandoned.

Herbicidal acids have been commonly used for controlling undesirable vegetation. The use of such acids in various salt forms, such as, for example, an alkali metal or ammonium salt, or an amine salt has been found effective in controlling many types of undesirable vegetation. In their acid form, the herbicidal acids are substantially insoluble in water and possess a very low level of solubility in normally used agricultural solvents. One disadvantage, especially of the inorganic salt form, has been the tendency for the compound to leach from soils under wet conditions resulting in poor weed control and possible crop injury. Low molecular weight esters of herbicidal acids have been used, but they have the serious disadvantage of extreme volatility whereby crops have been injured several miles from the point of herbicide application. The herbicide drift problem is a serious one, as for example, it is common to apply a herbicide composition alongside roadways and adjoining crops, such as cotton, vegetable plants, etc. must be protected from the action of the herbicidal composition. High molecular weight amine salts of herbicidal acids have been used due to their greater oil solubility and decreased volatility, but they have some disadvantage in the relatively lower amount of active herbicidal component which they contain.

It is preferred in the herbicidal art to apply the active herbicide in a water-in-oil emulsion, that is an emulsion having the oil as a continuous phase. The water-in-oil emulsions are generally known as invert emulsions. Invert emulsions having a high level of active herbicide component as the present compositions could not be prepared in the field using previously known herbicides, in the chemical form of the abovementioned herbicides, even when utilizing specialized emulsifying agents. Generally, the formulation of invert emulsions in the field has necessitated special equipment for vigorous stirring or shearing to form invert emulsions from the prior art herbicidal components.

It is an object of this invention to provide a herbicidal composition having a high level of active herbicidal ingredient as well as providing invert emulsifiable properties. It is a further object of this invention to provide a novel herbicidal composition which may be formulated into an invert emulsion system under field conditions by simple mixing.

This invention achieves the above objects by utilizing nitrogen containing esters of herbicidal acids formed by reacting certain alkoxylated amino compounds with plant hormone or organic herbicidal acids in combination with their acid salts formed by further reaction of the amino ester with an organic carboxylic acid, a plant hormone acid, or an organic herbicidal acid, or by using the acid salt of the amino ester alone. The amino ester of a herbicidal acid and the acid salt thereof or the acid salt of the amino ester may be formulated into an herbicidal concentrate using an organic solvent. When water is added to such a herbicidal concentrate, an invert emulsion is readily formed. Blended herbicides may be obtained by using different herbicidal acids to form the esterified groups, and by using different herbicidal acids to form the salts of the ester.

The amino esters suitable for use in this invention have the formula:

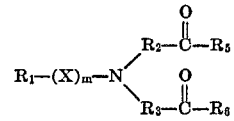

where $m$ is selected from 0 and 1 and, X is

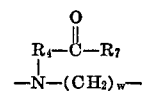

wherein $w$ is an integer of 2 to 4, $R_1$ is a hydrocarbon radical having from 6 to 22 carbon atoms in a hydrocarbon chain and selected from the group consisting of a normal-alkyl, normal-alkenyl and arylalkyl; $R_2$, $R_3$ and $R_4$ are selected from [1] $(CH_2CH_2O)_p$ for $R_2$, H and $$(CH_2CH_2O)_r$$

for $R_3$, and H and $(CH_2CH_2O)_s$ for $R_4$, and [2]

for $R_2$, H and

for $R_3$, and H and

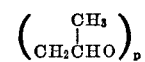

for $R_4$, wherein $p$, $r$ and $s$ are integers having a sum of 1 to 6; and

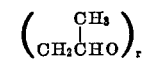

provided $R_3$ is other than H, and

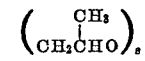

provided $R_4$ is other than H, is each an acyl radical of an herbicidal carboxylic acid selected from the group consisting of halo, alkyl, haloalkyl, alkoxy, nitro and amino-substituted pyridyl, phenyl and phenoxyalkanoic acids and 3,6-endoxohexahydrophthalic acid. The carboxylic acid-amine salts of the above amino esters may be formed using an aliphatic organic acid having 1 to about 6 carbon atoms or any of the above herbicidal carboxylic acids and 3,6-endoxohexahydrophthalic acid, or aromatic acids.

Herbicidal acids which can be utilized to formulate compositions of the present invention include the plant hormone acids, including the halo, alkyl, haloalkyl, alkoxy, nitro and amino substituted pyridyl, phenyl and phenoxyalkanoic acids such as 4-chloro-2-methylphenoxyacetic acid;
4-chloro-2-methylphenoxypropionic acid;
2,4-dichlorophenoxyacetic acid;
2,4,5-trichlorophenoxyacetic acid
α-(2,4-dichlorophenoxy)-propionic acid;
α-(2,4,5-trichlorophenoxy)-propionic acid;
γ-(2,4,5-trichlorophenoxy)-butyric acid;
2-methoxy-3,6-dichlorobenzoic acid;
2,3,6-trichlorophenylacetic acid;
2,3,6-trichlorobenzoic acid;
2,3,5-triiodobenzoic acid;
2,5-dichloro-3-aminobenzoic acid;
3,5-dichloro-2-pyridoxyacetic acid; and
4-amino-3,5,6-trichloropiocolinic acid; and
organic acids such as 3,6-endoxohexahydrophthalic acid.

Amines suitable to form the amino esters of the present invention include normal aliphatic and aryl substituted aliphatic amines having at least one alkoxylated group attached to the amino nitrogen.

Alkoxylated amines are well known in the art to be produced by the reaction of an alkylene oxide such as ethylene oxide or propylene oxide with a primary or secondary amine. The use of several moles of alkylene oxide per mole of amine results in an alkylene oxide adduct having repeated ether linkages with a terminal hydroxy function. The random growth of an alkylene oxide adduct by addition of alkylene oxide to hydroxyl functions is well known in the art. Therefore, when more than two moles of alkylene oxide is reacted with a mono amine and more than three moles with a diamine a mixture of alkylene oxide adduct chain lengths is formed. The product thus formed is identified by the sum of the alkylene oxide units or the moles of alkylene oxide reacted with a mole of amine. Thus $p$, $r$ and $s$ in the above formulae are integers having a sum of 1 to 6 indicating from 1 to 6 moles of alkylene oxide reacted with one mole of amine. Amines containing the beta hydroxyethyl function attached directly to the nitrogen atom have been found especially suitable to form the compounds for us in this invention.

Preferred aliphatic amines include alkoxylated tertiary amines having a normal-alkyl, normal-alkenyl, or aralalkyl group containing from about 6 to 22 carbon atoms in the hydrocarbon chain. Suitable normal alkyl groups include hexyl, heptyl, octyl, nonyl, decyl, hendecyl, dodecyl, tridecyl, tetradecyl, pentadecyl, hexadecyl, heptadecyl, octadecyl, nonadecyl, eicosyl, and docosyl. Suitable alkenyl groups include hexenyl, heptenyl, octenyl, nonenyl, decenyl, hendecenyl, dodecenyl, tridecenyl, tetradecenyl, pentadecenyl, hexadecenyl, heptadecenyl, octadecenyl, nonadecenyl, eicosenyl, and docosenyl. Mixtures of alkoxylated amines having both saturated and unsaturated groups such as derived from coconut oil, tallow and other natural sources may be used.

Especially preferred amines are the arylalkyl amines having the formula:

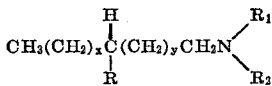

wherein $x$ and $y$ are integers from 0 to 19 and the total of $x$ and $y$ is an integer from 8 to 19, R is an aryl group selected from phenyl, naphthyl, and phenyl substituted with from 1 to 2 groups selected from methyl, hydroxy, methoxy, and phenoxy, and $R_1$ and $R_2$ are selected from
[1] $(CH_2CH_2O)_pH$ for $R_1$ and $—(CH_2CH_2O)_rH$ for $R_2$ and [2]

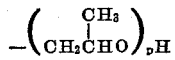

for $R_1$ and

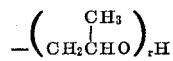

for $R_2$ where $p$ and $r$ are integers having a sum of 1 to 6. In a preferred subclass of compounds, $x$ and $y$ are integers from 0 to 15 and the sum of $x$ and $y$ is 15, such as N-phenylstearyl N,N-bis(β-hydroxyethyl)amine. In an especially preferred subclass $R_1$ and $R_2$ are —$CH_2CH_2OH$. The arylaliphatic alkoxylated tertiary amines suitable for use in this invention may be produced according to the method of U.S. Patent Number 3,492,352. Prefered arylalkyl groups include 9(10)-phenylstearyl and 9(10)-phenylundecyl.

Alkoxylated aliphatic polyamines wherein the amine contains at least one radical from 6 to 22 carbon atoms in the hydrocarbon chain thereof, selected from the group consisting of normal-alkyl, normal-alkenyl, and arylalkyl, and wherein the nitrogen atoms are linked by an alkylene group of from 2 to 4 carbon atoms are suitable to form the esters for use in this invention. Suitable alkylene groups include dimethylene, trimethylene, tetramethylene, 1,3 butylene and 2 methyl 1,3-propylene. Especially preferred polyamines are diamines wherein the nitrogen atoms are linked by a trimethylene group.

Mono- or di-esters may be formed depending upon whether monobasic or dibasic acids are used for ester formation and mono- or di-esters may be formed from monoamines, and mono-, di- or tri-esters may be formed from diamines. The extent of esterification is determined by the number of active hydroxyl groups in the amine and the mole ratio of acid to amine. Mixtures of acids may be used for esterification.

Mono- or di-acid salts of the ester may be formed depending upon the number of amino functions in the molecule. Carboxylic acids suitable for forming the amino herbicidal acid ester carboxylic acid salts useful in this invention include aliphatic acids having 1 to about 6 carbon atoms, such as, formic, acetic, propionic, butyric, valeric, caproic, oxalic, malonic, succinic, glutaric and adipic; aromatic acids such as benzoic, phthalic; any of the above identified herbicidal acids; and 3,6-endoxohexahydrophthalic acid. Preferred carboxylic acid salts are selected from the group consisting of halo, alkyl, haloalkyl, alkoxy, nitro and amino substituted pyridyl, phenyl and phenoxyalkanoic acids and 3,6 endoxohexahydrophthalic acid. An especially preferred alkanoic acid is acetic acid. Mixtures of acids may be used for salt formation.

The herbicidal estesr useful in this invention are readily prepared by reacting the alkoxylated amine with the herbicidal acid under a nitrogen blanket at a temperature from about 125–250° C. to esterify the acid function by splitting off water with the hydroxy function of the alkoxylated amine until the water of reaction is driven off. The presence of the ester is shown by the collection of one mole of water of reaction for each mole of acid reactant. Further confirmation of esterification may be obtained by infrared spectroscopic analysis. Mixtures of herbicidal acids may be used to prepare mixed esters.

Once the ester is formed, carboxylic acid-amino salts of the same or different herbicidal acids or other acids mentioned above may be made by the simple mixing of the ester and the acid to form a salt linkage between the nitrogen atom and the acid function of the herbicidal acid. For example, the ester and the herbicidal acid may be mixed in a solvent and warmed to about 80 to 120° C. until a homogeneous solution is obtained and then cooled until precipitation of the salt occurs.

We have found that the extremely active herbicidal esters referred to above, in combination with their acid salts possess excellent invert emulsification properties when water is added to an organic solvent containing herbicidally effective amounts of the herbicidal ester and its acid salt or the herbicidal amino ester acid salt alone.

The need for use of an additional emulsification agent, or specialized equipment to achieve invert emulsification is eliminated. There is no requirement of excess herbicidal acid being present to form the invert emulsion, but such emulsions can be formed with up to about 25 percent free acid present in addition to the ester and herbicidal acid amine salt of the ester.

Herbicidal concentrates of this invention are prepared by dissolving the amino esters and their acid salts or the amino ester acid salts alone in an organic solvent. Suitable organic solvents include commonly used agricultural oils including aromatic oils such as methylated naphthalenes, kerosenes, and alkylated benzenes such as xylenes and toluenes. The concentrates contain from about 5 to 95 weight percent of the organic solvent. From about 5 to 20 wt. percent solvent is preferred. The concentrate contains from about 5 to 95 wt. percent of the amino ester carboxylic acid salt; about 25 to 60 wt. percent being preferred. The concentrate may additionally contain from 0 to about 70 wt. percent amino herbicidal acid ester. As the ratio of ester amino salt to ester is decreased, less water will be accepted without breaking the invert emulsion.

The concentrates of this invention may be readily formulated into invert aqueous emulsions by addition of water with simple stirring. Mechanical agitation is not required in many cases rendering the concentrates of this invention particularly suitable for field preparation of highly herbicidally active invert aqueous emulsions for spray application with minimum drift. The invert emulsification, in many instances, takes place by simple mixing of the organic phase and water phase in a suitable proportioned pump mixing chamber. Water in the amount of about 0.5 part to 14 parts to 1 part concentrate is suitable depending upon the particular concentrate formulation. The invert aqueous emulsions may be formulated to contain herbicidally effective amounts of desired herbicides. The desired herbicides for particular herbicidal action is well known in the art. One advantage of this invention is the ability to blend different herbicides having desired properties into one molecule.

Our invention includes an herbicidal process of spraying undesired vegetation with an invert emulsion of about 0.5 to 14 parts by weight of water to 1 part by weight of an herbicidal concentrate composition comprising about 5 to 95 weight percent of an organic solvent and about 5 to 95 weight percent of a carboxylic acid salt of an amino ester having the formula

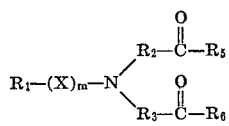

where $m$ is selected from 0 and 1 and, X is

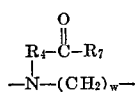

wherein $w$ is an integer of 2 to 4; $R_1$ is a hydrocarbon radical having from 6 to 22 carbon atoms in a hydrocarbon chain selected from the group consisting of a normal-alkyl, normal-alkenyl and arylalkyl; $R_2$, $R_3$ and $R_4$ are selected from [1] $(CH_2CH_2O)_p$ for $R_2$, H and $(CH_2CH_2O)_r$ for $R_3$, and H and $(CH_2CH_2O)_s$ for $R_4$, and [2]

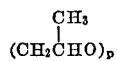

for $R_2$, H and

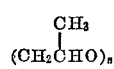

for $R_4$, wherein $p$, $r$ and $s$ are integers having a sum of 1 to 6; and

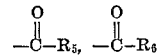

provided $R_3$ is other than H, and

provided $R_4$ is other than H is each an acyl radical of an herbicidal carboxylic acid selected from the group consisting of halo, alkyl, haloalkyl, alkoxy, nitro and amino-substituted pyridyl, phenyl and phenoxyalkanoic acids and 3,6-endoxohexahydrophthalic acid.

The following specific examples are illustrative of this invention.

Example I

Phenylstearic acid was prepared from commercial grade oleic caid which contained a few percent of palmitoleic acid by a Friedel-Crafts reaction using hydrofluoric acid as the catalyst and benzene as the arylating agent. Thereafter, phenylstearonitrile was prepared on a continuous nitrile unit over bauxite catalyst at 280–300° C. from 1127 gms. of phenylstearic acid. A crude yield of 833.5 gms. of phenylstearonitrile was obtained comprising a mixture of isomers with respect to location of the phenyl group, predominately the $C_8$ to $C_{14}$, and the $C_{17}$ isomers with lesser proportions of other isomers.

Phenylstearonitrile (591 gms.) was reduced in a 1-liter, Parr autoclave over 2% (by wt.) alcohol washed Raney nickel catalyst in the presence of ammonia (150 p.s.i. at 30–40° C.) and hydrogen (800 p.s.i. total pressure at 125° C.) for 4–5 hours. The product was obtained as a light amber oil, 582.3 gms. (97% crude yield). Phenylstearylamine was obtained in 67% yield upon distillation at 183–190° C. at 0.3 mm.

N-phenylstearyl N,N-bis (β-hydroxyethyl)amine was prepared by heating 1 mole of phenylstearylamine obtained above to 90° C., adding 2 moles of ethylene oxide to the closed reaction vessel, and raising the temperature to 110° C. for 5 hours.

Example II

One mole of bis (β-hydroxyethyl) phenylstearylamine (predominately 9,10-phenylstearyl), obtained by ethoxylation of phenylstearylamine in Example I, was heated with 2 moles, 2,4-dichlorophenoxyacetic acid under a nitrogen blanket until about two moles of water were collected showing the substantial formation of the 2,4-dichlorophenoxyacetic acid diester of N-9,10-phenylstearyl N,N-bis (β-hydroxyethyl)amine. Infrared spectroscopic analysis of the product confirmed that it was substantially all ester, with major ester-carbonyl absorption at 5.7 microns.

Herbicidal concentrates having the compositions shown in Table I were formulated using the amino esters and/or their herbicidal acid salt as formed above. All percentages are by weight.

Water was then added to the herbicidal concentrate using only hand mixing. Invert emulsions were readily formed in each case. The amount of water that could be added without breaking the invert emulsion was noted and is expressed in Table I as the concentrate:water ratio.

The viscosity of the emulsion was estimated.

TABLE I.—HERBICIDAL CONCENTRATES

| | | | | | | | | | |
|---|---|---|---|---|---|---|---|---|---|
| Percent 2,4-dichlorophenoxyacetic acid diester of N-9,10-phenylstearyl N,N-bis(β-hydroxyethyl)amine | 57.6 | 64.8 | 68.2 | 30.6 | 64.8 | 43.7 | 20.1 | | |
| Percent 2,4-dichlorophenoxyacetic acid salt of 2,4-dichlorophenoxyacetic acid diester of N-9,10-phenylstearyl N,N-bis(β-hydroxyethyl)amine | 22.4 | 25.2 | 26.2 | 60.3 | 25.2 | 46.3 | 70.0 | 89.7 | 77.4 |
| Percent free 2,4-dichlorophenoxyacetic acid | | | | | | | | 0.4 | 12.6 |
| Percent solvent | ¹20 | ¹10 | ¹5 | ¹9.1 | ²10 | ²10 | ²9.9 | ²9.9 | ²10 |
| Concentrate:water | 1:0.5 | 1:2.45 | 1:1.50 | 1:0.75 | 1:3 | 1:2.57 | 1:4 | 1:3.35 | 1:0.25 |
| Viscosity | Low | Low | Low | Low | Low | Med | High | High | High |

¹ Solvent is Cyclo Sol 63 produced by Shell Chemical Company containing 99.5% aromatic organic oils, 0.3% paraffins, and less than 0.3% naphthenes; specific gravity 0.899.
² Solvent is methylated naphthalene.

NOTE.—Low=500–1,500 centipoises; Med=1,500–6,000; High=6,000–10,000.

Example III

In the same manner as Example II, 1 mole of bis(β-hydroxyethyl) tallowamine¹ was reacted with 2 moles, 2,4-dichlorophenoxyacetic acid to form the diester. Infrared spectroscopic analysis of the product confirmed that it was substantially all ester, with major estercarbonyl absorption at 5.7 microns. The 2,4-dichlorophenoxyacetic acid salt of the diester was prepared in the same fashion as in Example II. Herbicidal concentrates were formed and water added as described in Example II to easily formulate invert emulsions containing up to the amount of water indicated in the concentrate:water ratio shown in Table II.

TABLE II.—HERBICIDAL CONCENTRATES

| | | | | |
|---|---|---|---|---|
| Percent 2,4-dichlorophenoxyacetic acid diester of N-tallow N,N-bis(β-hydroxyethyl)amine | 16.2 | 14.0 | 12.0 | 15.4 |
| Percent 2,4-dichlorophenoxyacetic acid salt of 2,4-dichlorophenoxyacetic acid N-tallow N,N-bis(β-hydroxyethyl)amine | 78.8 | 66.0 | 58.0 | 74.6 |
| Percent solvent | ¹5.0 | ¹20.0 | ²30.0 | ²10.0 |
| Concentrate:water | 1:0.5 | 1:4 | 1:5 | 1:0.75 |
| Viscosity | High | High | High | High |

¹ Solvent is Cyclo Sol 63 produced by Shell Chemical Company containing 99.5% aromatic organic oils, 0.3% paraffins, and less than 0.3% naphthenes; specific gravity 0.899.
² Solvent is methylated naphthalene.

NOTE.—High=6,000–10,000 centipoises.

Example IV

In the same manner as Example II, mole ratios of 1 mole of N(β-hydroxyethyl) N',N'-bis(β-hydroxyethyl) tallow trimethylene diamine was reacted with 3 moles of 2,4-dichlorophenoxyacetic acid at about 190° C. under a nitrogen blanket until about 3 moles of water of reaction was collected per mole of diamine reactant. The product was the 2,4-dichlorophenoxyacetic acid triester of N(β-hydroxyethyl)N',N'-bis(β-hydroxyethyl)tallow trimethylene diamine which was then mixed at about 100° C. with 2 moles of 2,4-dichlorophenoxyacetic acid per mole of triester in xylene to form the 2,4-dichlorophenoxyacetic acid disalt.

A concentrate of 2 pounds of triester disalt per gallon of xylene was added to 2 gallons of diesel oil. The three gallons of triester disalt-xylene-diesel oil composition was added with agitation to amounts of water varying from 14 to 22 gallons. In each case good invert emulsions of a mayonnaise consistency was obtained and sprayed on broad leaf weeds at the rate of 2 gallons per acre. The herbicidal spray was effective in killing the weeds. Herbicidal effect was observed to occur within 24 hours after application.

Example V

A herbicidal concentrate composition was formulated using the same herbicidal triester-disalt in an amount of 2 pounds per gallon of heavy aromatic naphthenic oil, using the same proportions to form invert aqueous emulsions in the same manner as in Example IV. Good invert emulsions of mayonnaise consistency were obtained and sprayed on broad leaf weeds at the rate of 2 gallons per acre. The herbicidal spray was effective in killing the weeds. Herbicidal effect was observed to occur within 24 hours after application.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. The herbicidal process comprising spraying undesired vegetation with an invert emulsion of about 0.5 to 14 parts by weight of water to 1 part by weight of an herbicidal concentrate composition comprising about 5 to 95 weight percent of an organic solvent and about 5 to 95 weight percent of a carboxylic acid salt of an amino ester having the formula

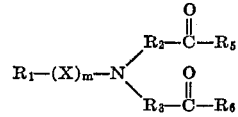

where $m$ is selected from 0 and 1 and, X is

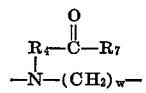

wherein $w$ is an integer of 2 to 4; $R_1$ is a hydrocarbon radical having from 6 to 22 carbon atoms in a hydrocarbon chain selected from the group consisting of a normal-alkyl, normal-alkenyl and arylalkyl; $R_2$, $R_3$ and $R_4$ are selected from [1] $(CH_2CH_2O)_p$ for $R_2$, H and $(CH_2CH_2O)_r$ for $R_3$, and H and $(CH_2CH_2O)_s$ for $R_4$, and [2]

for $R_2$, H and 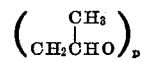

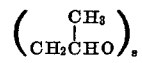

for $R_4$, wherein $p$, $r$ and $s$ are integers having a sum of 1 to 6; and

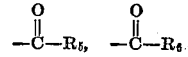

provided $R_3$ is other than H and

¹ Tallowamine is a mixture of hydrocarbon chain lengths from $C_{12}$ to $C_{18}$, both saturated and unsaturated; principally $C_{16}$ and $C_{18}$ saturated and $C_{18}$ mono-unsaturated.

(provided R₄ is other than H) is each an acyl radical of an herbicidal carboxylic acid selected from the group consisting of halo, alkyl, haloalkyl, alkoxy, nitro and amino-substituted phenoxyalkanoic acids.

2. An herbicidal concentrate composition having invert emulsifiable properties in water comprising about 5 to 95 wt. percent of an organic solvent and about 5 to 95 wt. percent of 2,4-dichlorophenoxyacetic acid salt of 2,4-dichlorophenoxyacetic acid diester of N-9,10-phenylstearyl N,N-bis(beta-hydroxyethyl) amine.

3. The herbicidal process comprising spraying undesired vegetation with an invert emulsion of about 0.5 to 14 parts by weight of water to 1 part by weight of an herbicidal concentrate composition comprising about 5 to 95 wt. percent of an organic solvent and about 5 to 95 wt. percent of 2,4-dichlorophenoxyacetic acid salt of 2,4-dichlorophenoxyacetic acid diester of N-9,10-phenylstearyl N,N-bis(beta-hydroxyethyl) amine.

4. An herbicidal concentrate composition having invert emulsifiable properties in water comprising about 5 to 95 weight percent of an organic solvent and about 5 to 95 weight percent of a carboxylic acid salt of an amino ester having the formula:

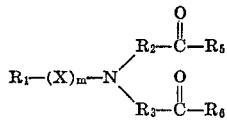

where m is selected from 0 to 1 and; X is

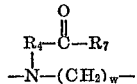

wherein w is an integer of 2 to 4; R₁ is an arylalkyl hydrocarbon radical having from 6 to 22 carbon atoms in the hydrocarbon chain; R₂, R₃ and R₄ are selected from [1] (CH₂CH₂O)ₚ for R₂, H and (CH₂CH₂O)ᵣ for R₃, and H and (CH₂CH₂O)ₛ for R₄, and [2]

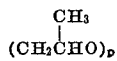

for R₂, H and

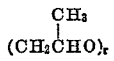

for R₃, and H and

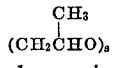

for R₄, wherein p, r and s are integers having a sum of 1 to 6; and

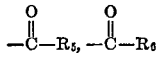

(provided R₃ is other than H) and

(provided R₄ is other than H) is each an acyl radical of an herbicidal carboxylic acid selected from the group consisting of halo-, alkyl-, haloalkyl-, alkoxy-, nitro- and amino-substituted phenoxyalkanoic acids.

5. The composition of claim 4 wherein said amino ester has the formula:

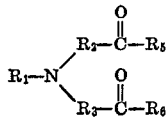

wherein R₁, R₂, R₃,

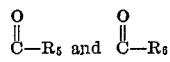

are defined as in claim 4.

6. The composition of claim 4 wherein said amino ester has the formula:

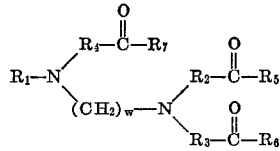

wherein w, R₁, R₂, R₃, R₄,

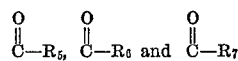

are defined as in claim 4.

7. The composition of claim 6 wherein w=3.

8. The composition of claim 4 wherein R₁ is

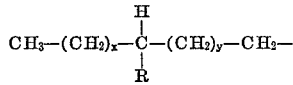

wherein x and y are integers of 0 to 19 and the sum of x and y is an integer from 8 to 19, and R is an aryl group selected from phenyl, naphthyl, and phenyl substituted with 1 to 2 groups selected from methyl, hydroxy, methoxy and phenoxy.

9. The composition of claim 8 wherein x and y are integers of 0 to 15 and the sum of x and y is 15.

10. The composition of claim 9 wherein R is phenyl, and R₂, R₃ and R₄ are selected from —(CH₂CH₂O)ₚ for R₂, H and —(CH₂CH₂O)ᵣ for R₃, and H and

—(CH₂CH₂O)ₛ for R₄.

11. The composition of claim 8 wherein R₁ is 9,(10)-phenylstearyl.

12. The composition of claim 8 wherein R₂ and R₃ are —CH₂CH₂O.

13. The composition of claim 12 wherein R₁ is a mixture of saturated and unsaturateed groups derived from tallow.

14. The composition of claim 4 wherein

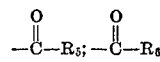

(provided R₃ is other than H) and

(provided R₄ is other than H) is a halo-substituted phenoxyalkanoic acid.

15. The composition of claim 4 wherein said salt-forming carboxylic acid is a phenoxyalkanoic acid.

References Cited
UNITED STATES PATENTS

| | | | |
|---|---|---|---|
| 2,843,471 | 7/1958 | Fischer | 71—117 |
| 3,511,637 | 5/1970 | Pflaumer | 71—109 |
| 3,539,613 | 11/1970 | Galvin et al. | 71—117 |

JAMES O. THOMAS, JR., Primary Examiner

U.S. Cl. X.R.

71—88, 94, 106, 108, 109, 111, Dig. 1